United States Patent
Miller et al.

(10) Patent No.: US 10,768,834 B2
(45) Date of Patent: Sep. 8, 2020

(54) METHODS FOR MANAGING GROUP OBJECTS WITH DIFFERENT SERVICE LEVEL OBJECTIVES FOR AN APPLICATION AND DEVICES THEREOF

(71) Applicant: NetApp, Inc., Sunnyvale, CA (US)

(72) Inventors: Evan Miller, McKinney, TX (US); Daniel Gosner, Cary, NC (US); Joe Sunday, Apex, NC (US); Srishylam Simharajan, Mars, PA (US); Kevin Stovall, Cary, NC (US); Raj Lalsangi, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 14 days.

(21) Appl. No.: 15/964,223

(22) Filed: Apr. 27, 2018

(65) Prior Publication Data
US 2019/0332293 A1 Oct. 31, 2019

(51) Int. Cl.
*G06F 3/06* (2006.01)
*G06F 9/50* (2006.01)

(52) U.S. Cl.
CPC .......... *G06F 3/0631* (2013.01); *G06F 3/0604* (2013.01); *G06F 3/067* (2013.01); *G06F 9/5016* (2013.01)

(58) Field of Classification Search
CPC ...... G06F 3/0631; G06F 3/067; G06F 3/0604; G06F 9/5016; G06F 9/455; G06F 9/50
USPC ................................................. 711/154, 170
See application file for complete search history.

(56) References Cited

U.S. PATENT DOCUMENTS

| | | | |
|---|---|---|---|
| 2013/0339297 A1* | 12/2013 | Chen | G06F 16/273 707/624 |
| 2014/0244585 A1* | 8/2014 | Sivasubramanian | ... G06F 16/21 |
| 2014/0245016 A1* | 8/2014 | Desai | G06F 3/0604 713/171 |
| 2014/0380307 A1 | 12/2014 | Zhu et al. | |
| 2016/0077926 A1* | 3/2016 | Mutalik | G06F 3/0683 711/162 |
| 2018/0054395 A1 | 2/2018 | Carey et al. | |

(Continued)

FOREIGN PATENT DOCUMENTS

| | | | | |
|---|---|---|---|---|
| EP | 3107244 A1 * | 12/2016 | ......... | H04L 12/2809 |
| WO | WO-2012004689 A1 * | 1/2012 | ......... | H04L 47/2425 |
| WO | WO-2017138942 A1 * | 8/2017 | ........... | G06F 3/0631 |

OTHER PUBLICATIONS

M. Kesavan, I. Ahmad, O. Krieger, R. Soundararajan, A. Gavrilovska and K. Schwan, "Practical Compute Capacity Management for Virtualized Datacenters," in IEEE Transactions on Cloud Computing, vol. 1, No. 1, pp. 1-1, Jan.-Jun. 2013.*

(Continued)

*Primary Examiner* — Pierre Miche Bataille
(74) *Attorney, Agent, or Firm* — Troutman Pepper Hamilton Sanders LLP (Rochester)

(57) ABSTRACT

Methods, non-transitory computer readable media, and computing devices that group objects with different service level objectives for an application includes receiving a request including a service level data to provision a volume. One or more aggregates for the received service level is identified. a resource pool including the identified one or more aggregates is generated. The volume including the generated resource pool with the identified one or more aggregates for the received service level is provisioned.

20 Claims, 3 Drawing Sheets

(56) References Cited

U.S. PATENT DOCUMENTS

2018/0203794 A1* 7/2018 Voccio ................ G06F 11/3466
2018/0262403 A1* 9/2018 Baracaldo ........... H04L 41/5009

OTHER PUBLICATIONS

International Search Report and Written Opinion for corresponding PCT Application No. PCT/US19/28155, dated Jul. 12, 1019.

* cited by examiner

METHODS FOR MANAGING GROUP OBJECTS WITH DIFFERENT SERVICE LEVEL OBJECTIVES FOR AN APPLICATION AND DEVICES THEREOF

FIELD

This technology relates to managing group objects with different service level objectives for an application.

BACKGROUND

A storage system is virtualized by separating logical functions of the server, storage, and network elements from physical functions. For example, all servers, storage, and network devices can be aggregated into independent pools of resources. Some elements may even be further subdivided, for example into server partitions, storage logical units (LUNs), and the like, to give an even more granular level of control. Elements from resource pools can be allocated, provisioned, and managed either manually or automatically, to adapt to changing needs and priorities of business.

Storage virtualization involves formation of an abstraction layer between physical storage devices and logical volumes consumed by applications. Virtualization abstracts storage capacity by mapping storage capacity providing elements, such as physical devices or logical units (LUNs), into a logical space, and creating logical devices that are presented to applications, erasing physical boundaries, creating pools of capacity that can be managed and accessed according to need. Prior technologies performed storage virtualization based on the type of storage aggregates and not the service level associated with the storage aggregate.

DETAILED DESCRIPTION

Figure 1:
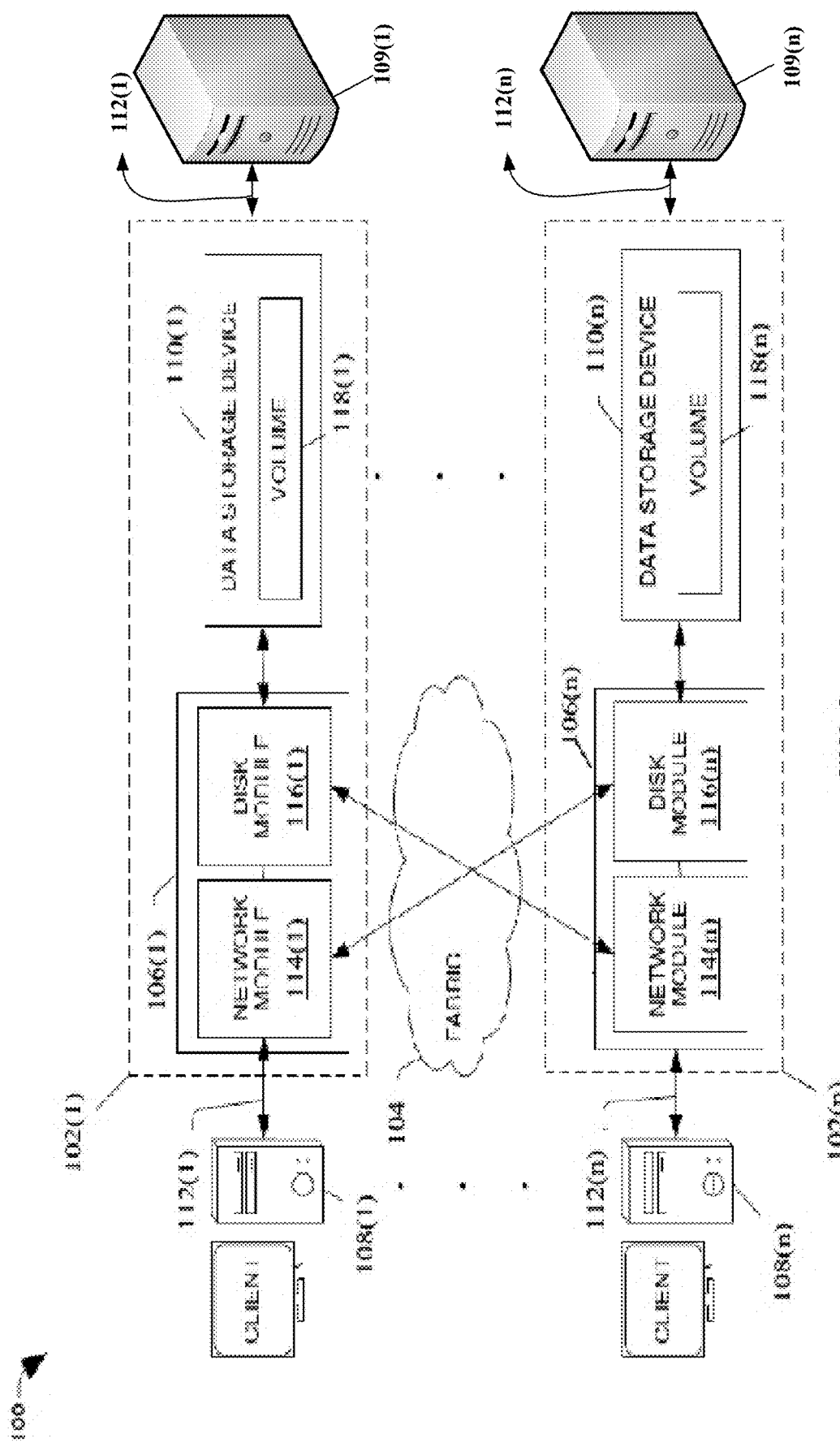
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and devices that allow managing group objects with different service level objectives for an application.

In this example, node computing devices 106(1)-106(n) can be primary or local storage controllers or secondary or remote storage controllers that provide client devices 108(1)-108(n), with access to data stored within data storage devices 110(1)-110(n) or the server devices 109(1)-109(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The server devices 109(1)-109(n) include a central processing unit (CPU) or processor, a memory, and a communication system, which are coupled together by a bus or other link, although other numbers and/or types of network devices could be used. Generally, the server devices 109(1)-109(n) process requests for providing requested web pages or websites received from the client devices 108(1)-108(n), via the storage network connections 112(1)-112(n) according to the HTTP-based application RFC protocol or the CIFS or NFS protocol in this example, but the principles discussed herein are not limited to this example and can include other application protocols. A series of applications may run on the server devices 109(1)-109(n) include that allows the transmission of applications requested by the client devices 108(1)-108(n), or the node computing devices 106(1)-106(n). The server devices 109(1)-109(n) may provide data or receive data in response to requests directed toward the respective applications on the server devices 109(1)-109(n) from the client devices 108(1)-108(n) or the node computing devices 106(1)-106(n). It is to be understood that the server devices 109(1)-109(n) may be hardware or software or may represent a system with multiple external resource servers, which may include internal or external networks.

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) and server devices 109(1)-109(n) can be networked with the node computing devices 106(1)-106(n) in the cluster, over the storage connections 112(1)-112(n). As an example, respective client devices 108(1)-108(n) and the server devices 109(1)-109(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118(1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
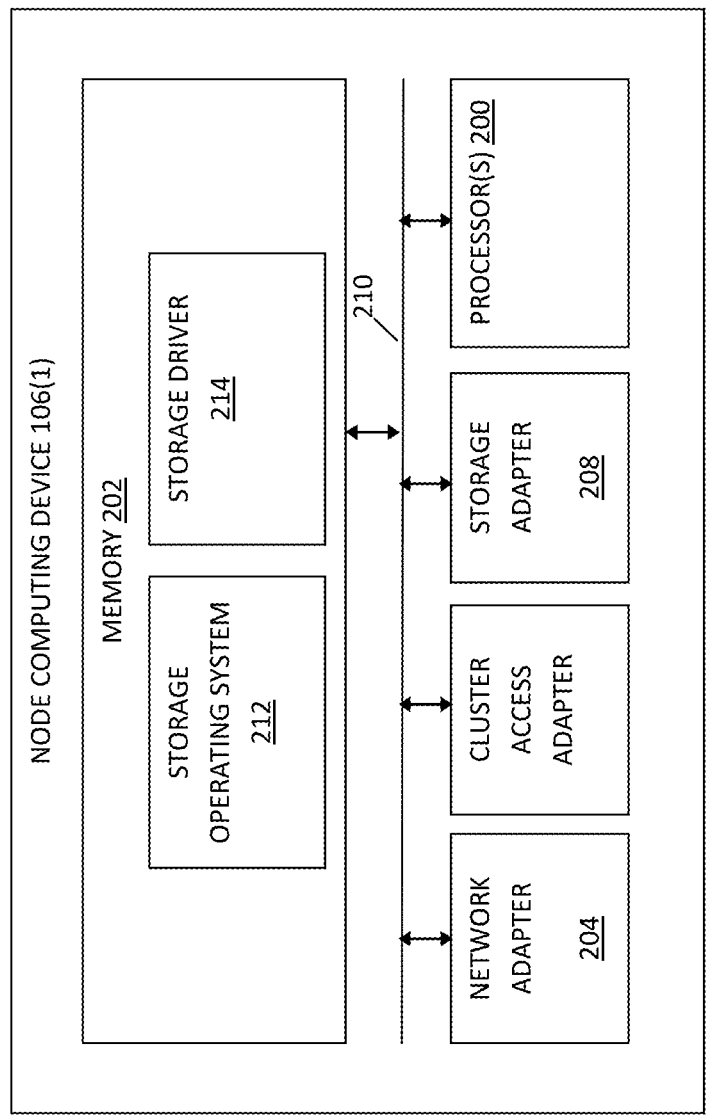
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Accordingly, the examples may be embodied as one or more non-transitory computer readable media having machine or processor-executable instructions stored thereon for one or more aspects of the present technology, as described and illustrated by way of the examples herein, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIG. 3, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIG. 3.

Figure 3:
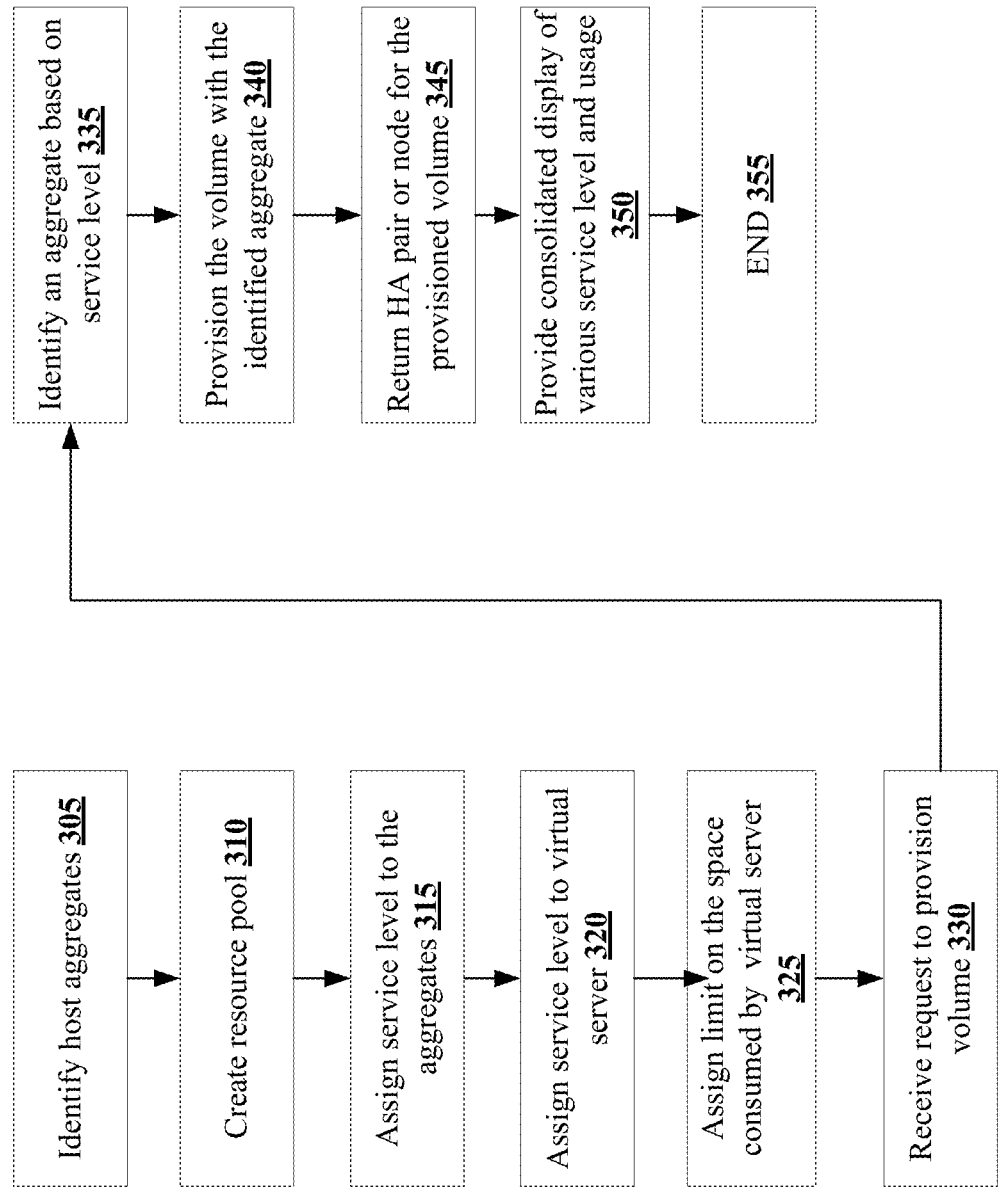
FIG. 3 is a flowchart of an exemplary method for managing group objects with different service level objectives for an application.

Referring to FIG. 3, an exemplary method for managing group objects with different service level objectives for an application. In step 305 in this example, the node computing device 106(1) identifies all the host aggregates in storage apparatuses 102(1)-102(n), although the node computing device 106(1) can identify the aggregates from other memory devices.

Next in step 310, the node computing device 106(1) creates a resource pool from the identified aggregates, although the resource pool can include other types or amounts of information. By way of example, the node computing device 106(1) can create the resource pool by grouping all the aggregates with the same memory size or within a designated range of memory size, although the node computing device 106(1) can be created based on other parameters.

Next in step 315, the node computing device 106(1) assigns one or more service levels to the aggregates in the created resource pool. In this example, the node computing device 106(1) can assign the service level based on the number of data operation requests supported by the aggregate, the type of data operation requests supported by the aggregate, or the size of the aggregate, although the node computing device 106(1) can use other types and/or amounts of parameters while assigning the service levels to the aggregates.

In step 320, the node computing device 106(1) assigns one or more service levels to a virtual server. In this example, the node computing device 106(1) can assign the service level to the virtual server based on the number of data operation requests supported by the virtual server, the type of data operation requests supported by the virtual server, or the size of the virtual server, although the node computing device 106(1) can use other types and/or amounts of parameters while assigning the service levels to the virtual servers.

In step 325, the node computing device 106(1) assigns the a limit to the total space that can be consumed by the virtual server based on the parameters described in step 320, although the node computing device 106(1) can assign the limit to the total space based on other types or number of parameters. Alternatively, in another example, the node computing device 106(1) can assign the limit to the total space that can be consumed b the virtual server for each assigned service level of the virtual server.

In step 330, the node computing device 106(1) receives a request to provision a volume for data operations from one of the plurality of client devices 108(1)-108(n). In this example, the received request includes the service level required by the volume, although the received request can include other types or amounts of data such as the number and/or type of the aggregates required in the volume.

In step 335, the node computing device 106(1) identifies an aggregate (or resource pool), based on the service level data in the received request, although the node computing device 106(1) can identify the aggregate based on other types and/or amounts of parameters.

In step 340, the node computing device 106(1) provisions the volume with the identified aggregate (or resource pool), although the node computing device 106(1) can include additional aggregates while provisioning the volume for the requested service level.

In step 345, the node computing device returns the high availability (HA) pair or the node where the volume was provisioned in the virtual server back to the requesting one of the plurality of client devices 108(1)-108(n).

In step 350, the node computing device 106(1) provides a consolidated display of the various service levels and their usage along with the aggregate, resource pool and the corresponding virtual server data to the requesting one of the plurality of client computing devices 106(1), although the node computing device 106(1) can provide other types or amounts of information. The exemplary method ends at step 355.

In the examples discussed above, the node computing device 106(1) monitors the space on all aggregates in the resource pool and/or the virtual server and returns the appropriate aggregate for the given service level and space required for any provisioning requirement. Additionally, the node computing device 106(1) can take into account any performance data provided on the aggregates and the flexible volumes in the cluster while returning the appropriate aggregate for the given service level. By using this technique, the disclosed technology reduces fragmentation by moving volumes around within the same service level thus freeing up more space for newer flexible volumes. Additionally, the disclosed technology can manage out-of-space conditions by moving volumes from reasonable full aggregates to appropriate ones based on the provided service level. Alternatively, the node computing device 106(1) can move less used data to slower service levels using polices, either wholly (flexible volume move) or partially (volume on demand). When the volume on demand is available, capacity and write intensive hotspot conditions can be managed with more predictability and immediately. Optionally, when the volume on demand offload is available, out-of-space conditions can be managed by offloading snapshot of used and unused blocks.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A computing device, comprising:
   a memory containing machine readable medium comprising machine executable code having stored thereon instructions for handling storage element failures to reduce storage device failure dates; and
   a processor coupled to the memory, the processor configured to execute the machine executable code to cause the processor to:
   identify one or more aggregates for received service level data within a designated range of memory sizes to provision a volume, wherein the provisioned volume is configurable to be moved within the identified one or more aggregates for the received service level data to reduce data fragmentation;
   generate a resource pool including the identified one or more aggregates; and
   provision the volume including the generated resource pool with the identified one or more aggregates for the received service level.

2. The computing device as set forth in claim 1, wherein the processor is further configured to execute the machine executable code to further cause the processor to return a high availability pair associated with the provisioned volume to a client device.

3. The computing device as set forth in claim 1, wherein the processor is further configured to execute the machine executable code to further cause the processor to assign an initial service level to a virtual server.

4. The computing device as set forth in claim 3, wherein the processor is further configured to execute the machine executable code to further cause the processor to allocate the identified one or more aggregates to the virtual server.

5. The computing device as set forth in claim 3, wherein the processor is further configured to execute the machine executable code to further cause the processor to assign a memory size limit on the virtual server.

6. The computing device as set forth in claim 3, wherein the processor is further configured to execute the machine executable code to further cause the processor to provide a consolidated report of utilization data associated with the provisioned volume including the identified one or more aggregates.

7. The computing device as set forth in claim 3 wherein the initial service level is assigned to the virtual server based on a number of data operation requests supported by the virtual server.

8. The computing device as set forth in claim 3 wherein the initial server level is assigned to the virtual server based on a type of data operation supported by the virtual server.

9. A method, comprising:
   identifying, by a computing device, one or more aggregates for received service level data within a designated range of memory sizes to provision a volume, wherein the provisioned volume is configurable to be moved within the identified one or more aggregates for the received service level data to reduce data fragmentation;
   generating, by the computing device, a resource pool including the identified one or more aggregates; and
   provisioning, by the computing device, the volume including the generated resource pool with the identified one or more aggregates for the received service level.

10. The method as set forth in claim 9 further comprising returning, by the computing device, a high availability pair associated with the provisioned volume to a client device.

11. The method as set forth in claim 9 further comprising, assigning, by the computing device, an initial service level to a virtual server.

12. The method as set forth in claim 11 further comprising, allocating, by the computing device, the identified one or more aggregates to the virtual server.

13. The method as set forth in claim 11 further comprising, assigning, by the computing device, a memory size limit on the virtual server.

14. The method as set forth in claim 9 further comprising, providing, by the computing device, a consolidated report of utilization data associated with the provisioned volume including the identified one or more aggregates.

15. A non-transitory machine readable medium having stored thereon instructions for group objects with different service level objectives for an application comprising machine executable code which when executed by at least one machine causes the machine to:
   identify one or more aggregates for received service level data within a designated range of memory sizes to provision a volume, wherein the provisioned volume is configurable to be moved within the identified one or more aggregates for the received service level data to reduce data fragmentation;
   generate a resource pool including the identified one or more aggregates; and
   provision the volume including the generated resource pool with the identified one or more aggregates for the received service level.

16. The medium as set forth in claim 15 wherein the machine executable code, when executed by the machine, further causes the machine to return a high availability pair associated with the provisioned volume to a client device.

17. The medium as set forth in claim 15 wherein the machine executable code, when executed by the machine, further causes the machine to assign an initial service level to a virtual server.

18. The medium as set forth in claim 17 wherein the machine executable code, when executed by the machine, further causes the machine to allocate the identified one or more aggregates to the virtual server.

19. The medium as set forth in claim 17 wherein the machine executable code, when executed by the machine, further causes the machine to assign a memory size limit on the virtual server.

20. The medium as set forth in claim 15 wherein the machine executable code, when executed by the machine, further causes the machine to provide a consolidated report of utilization data associated with the provisioned volume including the identified one or more aggregates.

* * * * *